(12) United States Patent
Zhao et al.

(10) Patent No.: US 12,497,321 B2
(45) Date of Patent: Dec. 16, 2025

(54) APPARATUS AND METHOD FOR ELIMINATING STRESS SPOTS ON A SURFACE OF GLASS

(71) Applicant: Luoyang North Glass Technology Co., Ltd., Henan (CN)

(72) Inventors: Leijun Zhao, Henan (CN); Yanwei Bai, Henan (CN); Ning Liu, Henan (CN)

(73) Assignee: Luoyang North Glass Technology Co., Ltd., Luoyang (CN)

( * ) Notice: Subject to any disclaimer, the term of this patent is extended or adjusted under 35 U.S.C. 154(b) by 205 days.

(21) Appl. No.: 18/204,375

(22) Filed: May 31, 2023

(65) Prior Publication Data
US 2024/0239700 A1   Jul. 18, 2024

(30) Foreign Application Priority Data
Jan. 17, 2023 (CN) .......... 202310084236.7

(51) Int. Cl.
C03B 27/04 (2006.01)
C03B 27/044 (2006.01)
C03B 35/16 (2006.01)

(52) U.S. Cl.
CPC ...... C03B 27/0404 (2013.01); C03B 27/0445 (2013.01); C03B 35/163 (2013.01); C03B 35/166 (2013.01)

(58) Field of Classification Search
CPC ........ C03B 27/04; C03B 35/16; C03B 35/165
See application file for complete search history.

(56) References Cited

U.S. PATENT DOCUMENTS

| | | | | |
|---|---|---|---|---|
| 2006/0254317 A1 * | 11/2006 | Serrano | ............... | C03B 27/0447 65/106 |
| 2020/0369550 A1 * | 11/2020 | Zhao | ............... | C03B 27/0404 |

FOREIGN PATENT DOCUMENTS

| | | | | |
|---|---|---|---|---|
| CN | 106430922 A | * | 2/2017 | ......... C03B 23/023 |
| CN | 107935364 A | * | 4/2018 | ......... C03B 23/023 |
| CN | 108017265 A | * | 5/2018 | ......... C03B 23/023 |
| CN | 111233311 A | * | 6/2020 | ......... C03B 27/0404 |
| CN | 111517628 A | * | 8/2020 | |
| CN | 108439776 B | * | 11/2020 | ......... C03B 27/012 |
| CN | 112408759 A | * | 2/2021 | ......... C03B 27/0404 |
| CN | 213977424 U | * | 8/2021 | ......... C03B 27/0404 |
| CN | 213977426 U | * | 8/2021 | |
| CN | 113683295 A | * | 11/2021 | |
| CN | 114230155 A | * | 3/2022 | ......... C03B 23/023 |
| EP | 3904300 A1 | * | 11/2021 | ......... C03B 23/023 |
| JP | 2004067416 A | * | 3/2004 | ......... C03B 27/0404 |

\* cited by examiner

*Primary Examiner* — Erin Snelting
*Assistant Examiner* — Steven S Lee (57) ABSTRACT

Disclosed in the present invention is an apparatus for eliminating stress spots on a surface of glass, comprising a conveying assembly, provided with a conveying surface for reciprocally conveying the glass along a conveying direction; an upper air-blowing assembly, provided above the conveying surface, used for guiding air to reciprocally flow above the conveying surface along a swinging direction extending along a width direction of the glass; and a lower air-blowing assembly, provided under the conveying surface, used for guiding air to reciprocally flow under the conveying surface along the swinging direction. A method for eliminating stress spots on a surface of glass comprises a conveying step, a glass swinging step, and an air-cooling step.

10 Claims, 3 Drawing Sheets

APPARATUS AND METHOD FOR ELIMINATING STRESS SPOTS ON A SURFACE OF GLASS

CROSS REFERENCE TO RELATED APPLICATIONS

The present application claims the benefit of Chinese Patent Application No. 202310084236.7 filed on Jan. 17, 2023, the contents of which are incorporated herein by reference in their entirety.

FIELD OF THE INVENTION

The present invention relates to the field of glass manufacturing, in particular to an apparatus and a method for eliminating stress spots on a surface of glass.

BACKGROUND OF THE INVENTION

At present, curved tempered glass, especially large curved glass in arc shape for architectural use, adopts a tempering process in which the heated glass is fed into the forming zone, where the forming, quenching and tempering processes are completed simultaneously. During the tempering process, all parts of the glass are required to be evenly heated, followed by rapid and even quenching. During the heating and quenching process, if there is a difference in temperature between any part of the glass surface and the overall surface, the tempering process will leave varying degrees of "marks" on the glass surface afterwards. The "manifestation" of tempering results from differences in the quenching temperature at various parts of the glass surface during the quenching process, commonly known in the industry as "stress spots" (also as "air patterns").

Figure 1:
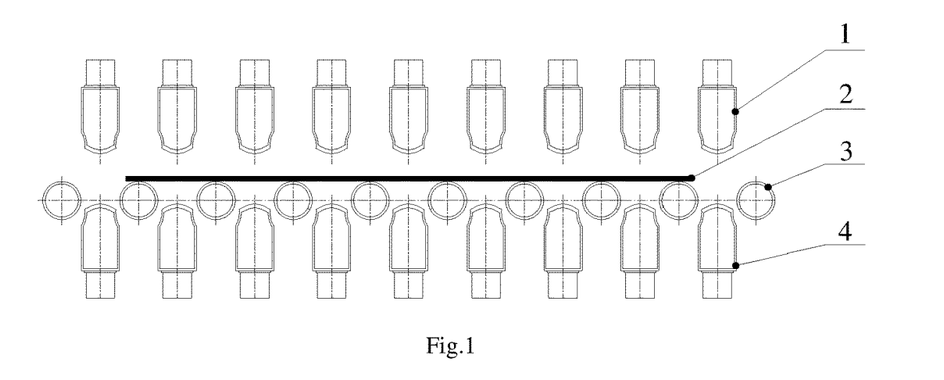
FIG. 1 is a structural diagram of a manufacturing state of the prior art.
Figure 2:
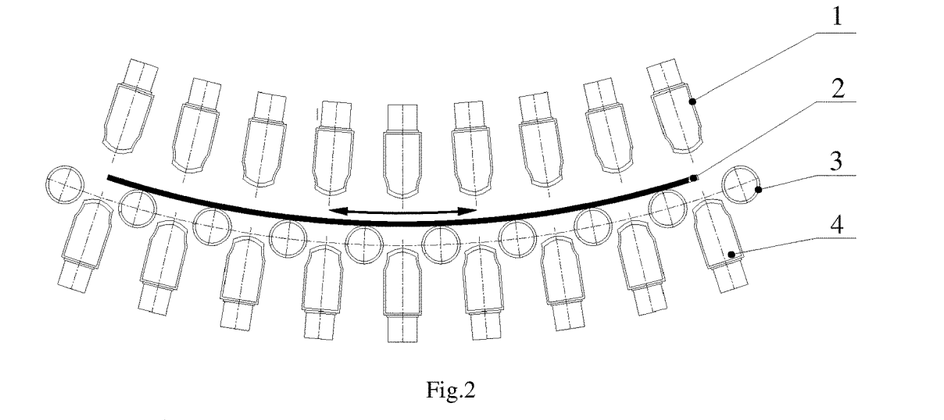
FIG. 2 is a structural diagram of another manufacturing state of the prior art.

Specifically, shown in FIG. 1 and FIG. 2 is the conventional curved tempered glass manufacturing device, comprising an upper air-fence 1, a lower air-fence 4, and a plurality of conveying rollers 3. When glass 2 is heated to a preset softening temperature in the furnace, the glass 2 is conveyed to the curved forming device as shown in FIG. 1, wherein the glass 2 is conveyed by the rotation of the conveying rollers 3 to between the upper air-fence 1 and the lower air-fence 4. As shown in FIG. 2, the glass 2 is then transformed from flat glass to curved glass under an action of the arc-transforming mechanism; then the upper air-fence and the lower air-fence blow air onto the upper and lower surface of the glass for quenching simultaneously; at the same time, during the forward and reverse rotation of the conveying rollers 3, the glass 2 swings reciprocally along the direction of the arrow shown in FIG. 2 on the curved surface formed by the conveying rollers 3. This conventional quenching process results in a tendency to leave "dots" or "strips" of stress spots on the surface of the glass.

Any curved tempered glass prepared by such a process suffers from the presence of tempering stress spots. Due to the different thickness and curvature of the glass, heating temperature, quenching air-pressure, blowing distance and other factors, the manifestation of stress spots and the degree of visualization is also different. Fundamentally, the stress spots on the surface of the curved tempered glass are "defects" that affects the optical performance of the glass surface. In recent years, as people's awareness of aesthetics is increasingly enhanced, there is a growing desire for curved tempered glass surfaces without stress spots, or without stress spots visible to the naked eye.

SUMMARY OF INVENTION

In order to overcome the shortcomings of the prior art, provided as a first purpose of the present invention is an apparatus for eliminating stress spots on a surface of glass, wherein the apparatus blows air reciprocally onto the glass on a conveying assembly by an upper air-blowing assembly and a lower air-blowing assembly, which leads to a reduction of the stress spots during the glass manufacturing process.

Provided as a second purpose of the present invention is a method for eliminating stress spots on a surface of glass, wherein the method leads to a reduction of the stress spots during the glass manufacturing process by blowing air reciprocally onto the glass.

The first purpose of the present invention is realized by adopting the following technical solutions.

An apparatus for eliminating stress spots on a surface of glass comprises: a conveying assembly, provided with a conveying surface for reciprocally conveying glass along a conveying direction; an upper air-blowing assembly, provided above the conveying surface, used for guiding air to reciprocally flow above the conveying surface along a swinging direction extending along a width direction of the glass; and a lower air-blowing assembly, provided under the conveying surface, used for guiding air to reciprocally flow under the conveying surface along the swinging direction.

Further, the conveying assembly comprises: a conveying supporting-frame; a plurality of conveying rollers, rotatably mounted on the conveying supporting-frame; and an arc-transforming mechanism, used for transforming the conveying supporting-frame into a circular arc in shape, so as to form a circular-arc-shaped conveying surface on the conveying rollers.

Further, the lower air-blowing assembly comprises: a plurality of air-fence supporting-frames, connected to the conveying supporting-frame; a plurality of air-fence plates, rotatably mounted on the air-fence supporting-frame, provided with a plurality of air blowholes, used for guiding air to blow to the conveying surface; and a swing driving mechanism, driving the air-fence plates to reciprocally swing along the swinging direction.

Further, the swing driving mechanism comprises: a motor, mounted on the air-fence supporting-frame; and an eccentric wheel, wherein the motor drives the eccentric wheel to rotate, and the eccentric wheel guides the air-fence plates to swing during rotation.

Further, the lower air-blowing assembly also comprises a lift-down assembly driving the air-fence plates to move close to or away from the conveying surface.

Further, the upper air-blowing assembly is identical to the lower air-blowing assembly in structure.

Further, the arc-transforming mechanism comprises: a plurality of arc-transforming plates; and an arc-transforming-plate driving part, used for driving the arc-transforming plates to rotate, wherein two adjacent arc-transforming plates are hinged to each other, the conveying rollers are pivoted to the arc-transforming plates, each air-fence supporting-frame are connected to each arc-transforming plates, and two adjacent air-fence supporting-frames are connected through a universal joint.

Further, the arc-transforming-plate driving part comprises: a sprocket, pivoted to the air-fence supporting-frame; a sprocket shaft, synchronously connected to the sprocket; and a sprocket-shaft driving part.

The second purpose of the present invention is realized by adopting the following technical solutions.

A method for eliminating stress spots on a surface of glass comprises: a conveying step, the glass being conveyed to between an upper air-blowing assembly and a lower air-blowing assembly by a conveying assembly during a quenching and tempering period of the curved glass; a glass swinging step, the glass swinging reciprocally under an action of the conveying assembly along a conveying surface; and an air-cooling step, the upper air-blowing assembly blowing reciprocally along a width direction of an upper surface of the glass, the lower air-blowing assembly blowing reciprocally along a width direction of a lower surface of the glass.

Further, reciprocally swinging direction of the glass in the glass-swinging step is staggered with reciprocally blowing direction in the air-cooling step.

Further, the method for eliminating stress spots on a surface of glass also comprises a glass manufacturing step; main components of a tempered glass manufacturing apparatus are, in a direction of a manufacturing process, a heating sector and the aforementioned apparatus; the heating sector comprises a furnace chamber, heating elements provided in the furnace chamber, and a group of ceramic conveying rollers; and a plane constituted by generatrices on the ceramic conveying rollers is horizontal.

Compared to the prior art, the beneficial effects of the present invention are as follows.

During the processing of the curved tempered glass, the air-blowing position is changed from a static state to a periodic reciprocal swing along the axial direction of the roller. Adopting the method mentioned above may eliminate stress spots on the surface of the curved tempered glass to a greatest extent, which leads to a significant increase in the optical performance on the glass surface and the visual comfort.

10: conveying assembly; 11: conveying roller; 12: arc-transforming plate; 13: sprocket; 20: lower air-blowing assembly; 21: air-fence plate; 22: air-fence supporting-frame; 221: universal joint; 23: eccentric wheel; 24: lift-down assembly; 30: upper air-blowing assembly; 40: glass.

DETAILED DESCRIPTION OF THE PREFERRED EMBODIMENTS

The present application is described below in conjunction with the attached drawings and by means of specific embodiments.

In the description of the present invention, it is to be noted that the terms "up", "down", "front", "back", "left", "right", "vertical", "horizontal", "top", "bottom", "inside", "outside" and other orientation or lateral position relationships are based on the orientation or lateral position relationships shown in the attached drawings. It is only intended to facilitate description and simplify operation, but not to indicate or imply that the referred device or element has a specific orientation, or is constructed and operated in a specific orientation. Therefore, they should not be construed as a limitation of the present invention.

Unless otherwise defined, all terms including technical and scientific terms used herein have the same meaning as commonly understood by those skilled in the art to which the present invention belongs. The terms used herein in the specification of the present invention are used only to describe specific embodiments and are not intended as a limitation of the invention.

Embodiment 1

As shown in FIGS. 3 to 8, an apparatus for eliminating stress spots on a surface of glass comprises a conveying assembly 10, an upper air-blowing assembly 30, and a lower air-blowing assembly 20; the conveying assembly 10 has a conveying surface, on which glass 40 after manufacturing may be placed, through which the glass 40 may be reciprocally conveyed along a conveying direction; the glass 40 may reciprocally swing by blowing during a quenching period.

Figure 4:
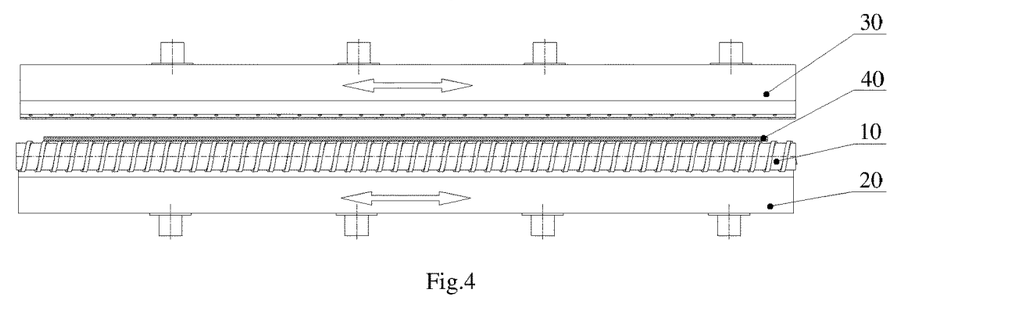
FIG. 4 is a structural diagram of the present invention.

Specifically, the upper air-blowing assembly 30 is provided above the conveying surface and may guide air to reciprocally flow above the conveying surface along a swinging direction. The lower air-blowing assembly 20 is provided under the conveying surface and may guide air to reciprocally flow under the conveying surface along the swinging direction, wherein the swinging direction extends along a width direction of the glass 40. Due to the conveying direction extending generally along a length direction of the glass 40, when blowing, the glass 40 is reciprocally conveyed by the conveying assembly 10 along a length direction of the glass 40. Driven by the conveying assembly 10, air may flow on different segments of the glass 40 along the length direction of the glass 40; with the upper air-blowing assembly 30 and the lower air-blowing assembly 20 extending along the width direction of the glass 40, air may flow along the width direction of the glass 40 guided by the upper air-blowing assembly 30 and the lower air-blowing assembly 20; in such a setup, air may flow along both the length direction and width direction of the glass 40. On the basis of this structure, adopting the apparatus for eliminating stress spots on a surface of glass in the present invention, the glass 40 may be formed in a forming sector of a device and then tempered by quenching. The glass 40 may first be heated in the forming sector, and then the heated glass 40 may be conveyed to a quenching sector.

When the glass 40 is conveyed to the quenching sector, the upper air-blowing assembly 30 and the lower air-blowing assembly 20 in the present invention may blow to an upper surface and a lower surface of the glass 40 located on the conveying surface of the conveying assembly 10; the upper air-blowing assembly 30 may guide air to blow along the width direction of the glass 40 reciprocally, i.e., the upper air-blowing assembly 30 may blow air reciprocally onto the upper surface of the glass 40; similarly, the lower air-blowing assembly 20 may guide air to blow along the width direction of the glass 40 reciprocally, i.e., the lower air-blowing assembly 20 may blow air reciprocally onto the lower surface of the glass 40.

Figure 3:
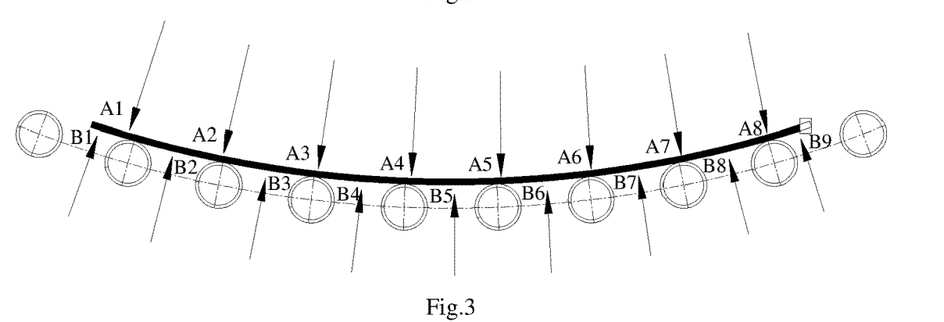
FIG. 3 is a structural diagram of air flowing direction of a manufacturing state of the prior art.

Please refer to the adoption by means of direct air-blowing in the prior art in FIG. 3.

The upper air-blowing assembly 30 blows air directly onto an upper surface of the glass 40; a plurality of air-blowing points, i.e., A1, A2, A3, A4, A5, A6, A7, A8, etc., may be formed on the upper surface of the glass 40 by the upper air-blowing assembly 30. The lower air-blowing assembly 20 blows air directly onto a lower surface of the glass 40; a plurality of air-blowing points, i.e., B1, B2, B3, B4, B5, B6, B7, B8, B9, etc., may be formed on the lower surface of the glass 40 by the lower air-blowing assembly 20. On the basis of this structure, the cooling points (i.e., the air blowing points) formed on the upper surface and the lower surface of the glass 40 are identical and inconsecutive, thereby forming stress spots on corresponding positions.

Figure 5:
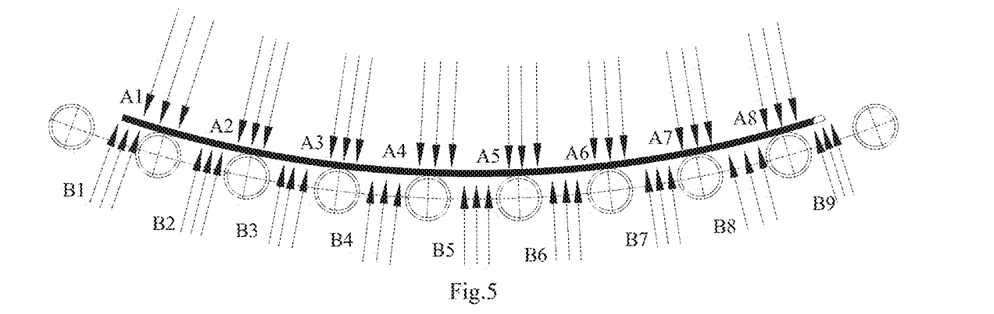
FIG. 5 is a structural diagram of air flowing direction of a manufacturing state of the present invention.
Figure 6:
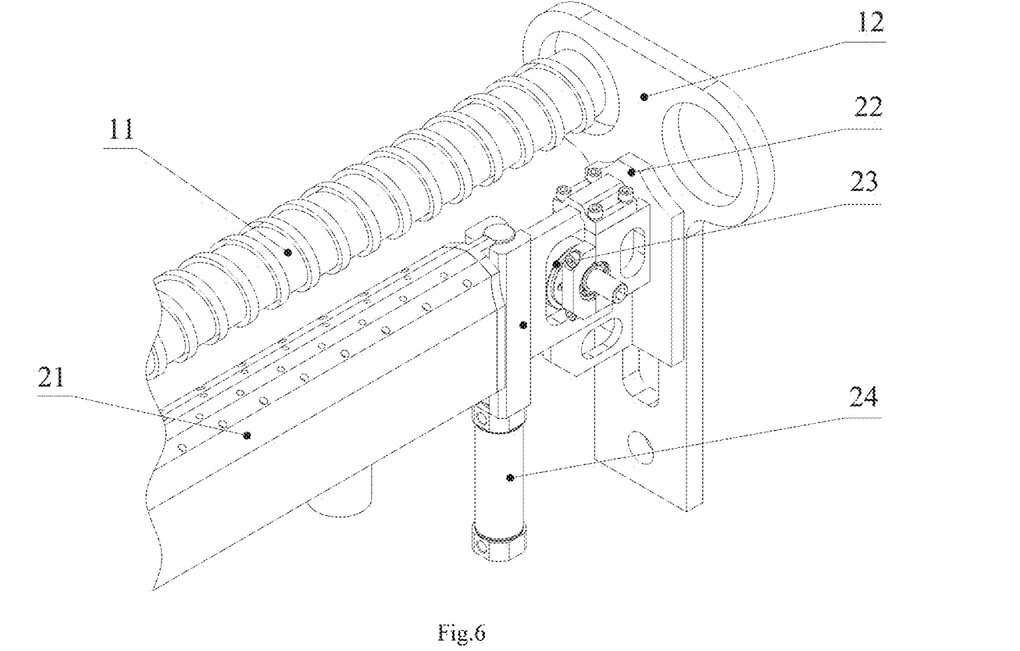
FIG. 6 is a diagram of a partial structure of the present invention.

In the present invention, air may be reciprocally blown along the width direction of the glass 40 on the upper surface and the lower surface of the glass 40 by the upper air-blowing assembly 30 and the lower air-blowing assembly 20; on the basis of the present structure, a plurality of air blowing points may reciprocally be formed on the same position by the upper air-blowing assembly 30; compared to FIG. 3 in the prior art, referring to FIG. 5, a plurality of upper air-blowing points may be formed by the upper air-blowing assembly 30 on different positions. i.e., A1, A2, A3, A4, A5, A6, A7, A8, etc. Due to consecutive airflow during the swing of the air-fence plates 21, an upper air-blowing plane may be formed by a plurality of consecutively connecting upper air-blowing points, i.e., A1, A2, A3, A4, A5, A6, A7, A8, etc. A plurality of lower air-blowing points may be formed by the lower air-blowing assembly 20 on different positions, i.e., B1, B2, B3, B4, B5, B6, B7, B8, B9, etc. Hence, a lower air-blowing plane may be formed by a plurality of consecutively connecting lower air-blowing points, i.e., B1, B2, B3, B4, B5, B6, B7, B8, B9, etc.

In such a setup, the glass 40 swings reciprocally driven by the conveying assembly 10, wherein an air-outlet plane is formed along the length direction of the glass 40; the reciprocal swing of the glass 40 is cooperated with the reciprocal air-flow blowing by the upper air-blowing assembly 30 and the lower air-blowing assembly 20, so that a plurality of consecutive cooling points may be formed on the upper surface and the lower surface of the glass 40, wherein an air-outlet plane is formed along the width direction of the glass 40; synthesis of the two movements leads to that a plurality of consecutive cooling points may be formed on the upper surface and the lower surface of the glass 40; the glass 40 is quenching through the air-outlet plane formed by consecutive air-outlet points during the air-cooling period, so as to lead to a more even surface of the glass 40, thereby eliminating stress spots on the surface of curved tempered glass 40, which lead to an increase of the optical quality of the glass 40.

In summary, in the present invention, during the processing of the curved tempered glass 40, the position of air-blowing is changed from a static state to a periodic reciprocal swing along the width direction of the glass 40, by which an upper air-outlet plane and a lower air-outlet plane are formed, which leads to a greater air-exposing plane of the glass 40. Adopting the method mentioned above may eliminate stress spots on the surface of the curved tempered glass 40 to a greatest extent, which leads to a significant increase in the optical performance on the glass 40 surface and visual comfort.

Figure 7:
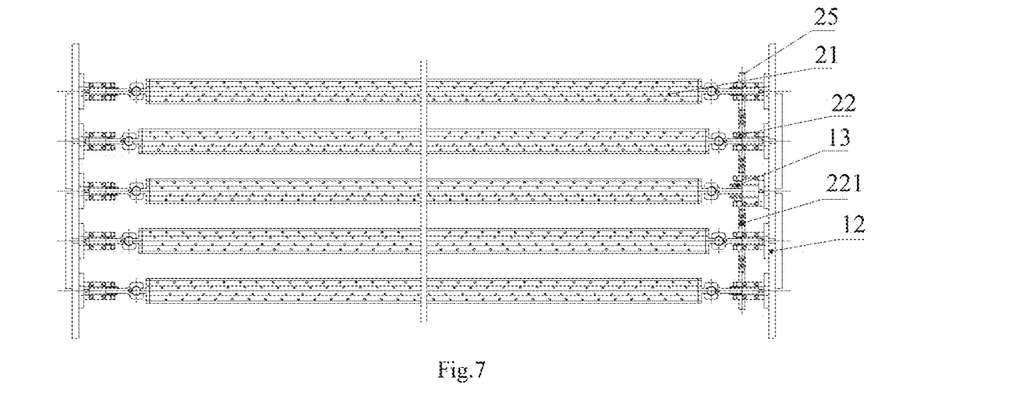
FIG. 7 is a diagram of an assembling structure of the conveying assembly and the lower air-blowing assembly of the present invention.
Figure 8:
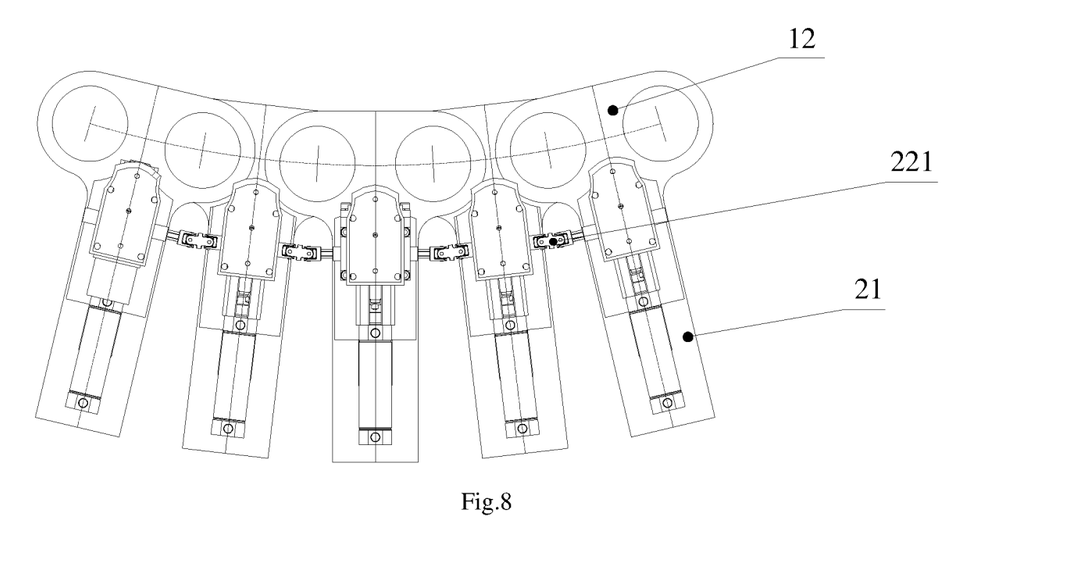
FIG. 8 is a diagram of an assembling structure in another view of the conveying assembly and the lower air-blowing assembly of the present invention.

Specifically, the conveying assembly 10 comprises: a conveying supporting-frame; a plurality of conveying rollers 11, rotatably mounted on the conveying supporting-frame; and an arc-transforming mechanism, used for transforming the conveying supporting-frame into a circular arc in shape, so as to form a circular-arc-shaped conveying surface on the conveying rollers 11.

On the basis of this structure, a plurality conveying rollers 11 are pivoted to the conveying supporting-frame; during the conveying of the glass 40 by each conveying roller 11, the supporting plane formed by each connected conveying roller 11 is the conveying surface; in such a setup, the conveying direction is the arranging direction of the conveying rollers 11, while the swinging direction is the extending direction of the axis of the conveying rollers 11.

During the quenching processing, due to a reciprocally swinging demand of the curved glass 40, when a flat conveying surface is adopted, the curved glass 40 may only partially contact the conveying rollers 11; when the curved glass 40 is reciprocally driven by the conveying rollers 11, the curved glass 40 may be easy to shake and drop off. Therefore, in order to achieve a better fitting of the curved glass 40 to the conveying surface, the conveying supporting-frame may be transformed by an arc-transforming mechanism into a circular arc in shape; due to a circular arc in shape of the conveying supporting-frame, the supporting plane (i.e., the conveying surface) for glass 40 formed by conveying rollers 11 pivoted to the conveying supporting-frame may also be a circular arc in shape; during the conveying of the curved glass 40, the conveying surface, circular arc in shape, formed by the conveying supporting-frame may also be adaptively adjusted based on the curvature of the curved glass 40.

Admittedly, the conveying rollers 11 may also be substituted by conveying wheels. On the basis of this structure, the conveying wheels are provided on both sides of the conveying supporting-frame; both sides of the glass 40 are supported by a plurality of conveying wheels, wherein supporting planes of the conveying wheels are connected and form the conveying surface.

Embodiment 2

In the present embodiment, the lower air-blowing assembly 20 comprises a plurality of air-fence supporting-frames 22, connected to the conveying supporting-frame; a plurality of air-fence plates 21, rotatably mounted on the air-fence supporting-frame 22, provided with a plurality of air blow-holes, used for guiding air to blow to the conveying surface; and a swing driving mechanism, driving the air-fence plates 21 to reciprocally swing along the width direction of the glass 40.

On the basis of this structure, when the lower surface of the glass 40 is air-cooling, the air-fence plates 21 may be driven by the swing driving mechanism to swing relative to the air-fence supporting-frames 22; a plurality of air blow-holes provided on the air-fence plates 21, when blowing air, due to the swing of the air-fence plates 21, the airflow guiding by the air blowholes on the air-fence plates 21 onto the lower surface of the glass 40 may distribute along the swinging direction, so as to blow air reciprocally onto the lower surface of the glass 40 above the air-fence plates 21.

It is to be noted that a distance formed between the reciprocally air-blowing plane formed by the air-fence plates 21 and the lower surface of the curved glass 40 may be in great difference, when the curvatures of the reciprocally air-blowing plane formed by the air-fence plates 21 and of the curved glass 40 are not basically the same, which may also lead to a relatively great difference in cooling temperature on different air-blowing point, so that stress spots may be formed.

In the present embodiment, the air-fence supporting-frame 22, used for mounting the air-fence plates 21, is connected to the conveying supporting-frame, so the air-fence supporting-frame 22 may transform curvature following the conveying supporting-frame, so that the air-blowing plane formed by the air-fence plates 21 may match the arc-shaped conveying surface. The curvatures of the reciprocally air-blowing plane formed by the air-fence plates 21 and of the curved glass 40 are basically the same, so that evenly air-blowing point may be formed on the lower surface of the curved glass 40 by the air-blowing plane, thereby forming better air-blowing points.

Further, the swing driving mechanism comprises a motor 25, mounted on the air-fence supporting-frame 22; and an eccentric wheel 23, wherein the motor 25 drives the eccentric wheel 23 to rotate, and the eccentric wheel 23 guides the air-fence plates 21 to swing during rotation. On the basis of this structure, the air-fence plates 21 are driven to swing by the rotation of the motor 25 and the rotation of the eccentric wheel 23 driven by the motor 25; a protruding part of the eccentric wheel 23 may abut and drive the air-fence plates 21 during rotation; different positions of the eccentric wheel 23 abut the air-fence plates 21 during one turn, so as to enable the swing of the air-fence plates 21 by the eccentric wheel 23, wherein the swinging range is based on the eccentric distance of the eccentric wheel 23.

Admittedly, air-fence plates 21 may swing directly driven by the motor 25. On the basis of this structure, the swinging range is greater; however, since provided are a plurality of air-fence plates 21, a too-great swinging range is prone to lead to interference and is not easily controlled.

Further, the lower air-blowing assembly 20 further comprises a lift-down assembly 24 driving the air-fence plates 21 to move close to or away from the conveying surface. On the basis of this structure, air-fence plates 21 may move driven by the lift-down assembly 24, so as to adjust the distance between the air-outlet plane of the air-fence plates 21 and the lower surface of the glass 40, wherein the distance may be adjusted based on the cooling temperature.

The lift-down assembly 24 mentioned above may be a linear output structure such as a cylinder or electric slider in the prior art.

It is to be noted that the air blowholes on the air-fence plates 21 mentioned above may guide airflow to disperse and export; the swing of the air-fence plates 21 imposes even cooling airflow along the width direction of the glass 40, which is cooperated with the distribution of the air blowholes on the air-fence plates 21 also along the width direction, so as to further guide airflow to additionally disperse, that is, the cooling airflow is distributed along at least two directions, which leads to a more evenly quenching on different positions on the upper and lower surface of the glass 40, so that formation of the stress spots may further reduce.

Embodiment 3

The upper air-blowing assembly 30 is identical to the lower air-blowing assembly 20 in structure in the First Embodiment. However, in the present embodiment differing from the First Embodiment, the upper air-blowing assembly 30 is provided above the conveying surface and blows air for quenching above the conveying surface, whose working principle and effects are not detailed repeated hereby.

Embodiment 4

In the present embodiment, the arc-transforming mechanism of the conveying assembly 10 comprises a plurality of arc-transforming plates 12; and an arc-transforming-plate driving part, used for driving the arc-transforming plates 12 to rotate, wherein two adjacent arc-transforming plates 12 are hinged to each other, the conveying rollers 11 are pivoted to the arc-transforming plates 12, each air-fence supporting-frame 22 are connected to each arc-transforming plates 12, and two adjacent air-fence supporting-frames 22 are connected through a universal joint 221.

On the basis of this structure, the conveying supporting-frame may be formed by the arc-transforming plates 12 hinged to each other, to which the conveying rollers 11 are pivoted; during the realization of the arc-transforming of the conveying rollers 11, the arc-transforming-plate driving part drives the arc-transforming plates 12 to rotate; the rotation on one of the arc-transforming plates 12 drives the rotation on an adjacent one of the arc-transforming plates 12, so that the conveying rollers 11 connected to the arc-transforming plates 12 may change positions as the arc-transforming plates 12 rotate, in which the conveying rollers 11 may change positions on the single arc-transforming plate 12, thereby forming an arc-shaped conveying surface.

It is to be noted that the arc-transforming plates 12 are hinged through a universal joint 221; specifically, the universal joint 221 may be a universal coupling in the prior art. By adopting the universal coupling to realize the connection, two adjacent arc-transforming plates 12 may extend and retract, which enables a serial connection between air-fence supporting-frames 22. Further, the extension and retraction of the universal coupling may meet the arc-transforming demand in different states of curvature.

It is to be noted that the arc-transforming plates 12 may be driven by solely the arc-transforming-plate driving part to rotate, or the rotation of one of the arc-transforming plates 12 drives the rotation of the other arc-transforming plates 12.

Additionally, the arc-transforming mechanism may be realized by adopting a chain of the prior art. On the mounting basis of using chain links of the chain, mounting bases are provided on each chain link, wherein all ends of conveying rollers 11 are pivoted to the mounting bases, so that the conveying supporting-frame formed by the chain links may form a certain arc as the chain swings.

Admittedly, the conveying supporting-frame may also be made of flexible materials, such as rubber. When the conveying supporting-frame possesses certain flexibility, on which the conveying rollers 11 are rotatably mounted, the conveying supporting-frame may deform in a certain extent driven by an external force, so as to realize arc-transforming. In such a setup, the arc-transforming mechanism may be a simple adoption of a lifting cylinder to impose pressure, but this structure may lead to an insufficient overall strength of the conveying assembly 10, in which a certain curved surface may only be formed by arranging multiple positions for imposing pressure, thereby leading to a relatively inconvenient operation of arc-transforming.

Further, the arc-transforming-plate driving part comprises a sprocket 13, pivoted to the air-fence supporting-frame 22; a sprocket shaft, synchronously connected to the sprocket 13; and a sprocket-shaft driving part.

On the basis of this structure, the sprocket-shaft driving part drives the sprocket shaft to rotate, and rotation of the sprocket shaft drives the sprocket 13 to rotate. Since the sprocket 13 is pivoted to the air-fence supporting-frame 22 connected to the conveying supporting-frame, during the rotation of the air-fence supporting-frame 22, the conveying supporting-frame may be driven to transform at corresponding positions, which may realize the transformation on the curvature of the conveying supporting-frame.

Embodiment 5

A method for eliminating stress spots on a surface of glass comprises: a conveying step, the glass 40 being conveyed to between an upper air-blowing assembly 30 and a lower air-blowing assembly 20 by a conveying assembly 10 during a quenching and tempering period of the curved glass 40; a glass swinging step, the glass swinging reciprocally under an action of the conveying assembly 10 along a conveying surface; and an air-cooling step, the upper air-blowing assembly 30 blowing reciprocally along a width direction of an upper surface of the glass 40, the lower air-blowing assembly 20 blowing reciprocally along a width direction of a lower surface of the glass 40.

Please refer to the adoption by means of direct air-blowing in the prior art in FIG. 3.

The upper air-blowing assembly 30 blows air directly onto an upper surface of the glass 40; a plurality of air-blowing points, i.e., A1, A2, A3, A4, A5, A6, A7, A8, etc., may be formed on the upper surface of the glass 40 by the upper air-blowing assembly 30. The lower air-blowing assembly blows air directly onto a lower surface of the glass 40; a plurality of air-blowing points, i.e., B1, B2, B3, B4, B5, B6, B7, B8, B9, etc., may be formed on the lower surface of the glass 40 by the lower air-blowing assembly 20. On the basis of this structure, the cooling points (i.e., the air-blowing points) formed on the upper surface and the lower surface of the glass 40 are identical and inconsecutive, thereby forming stress spots on corresponding positions.

In the present invention, air may be reciprocally blown along the width direction of the glass 40 on the upper surface and the lower surface of the glass 40 by the upper air-blowing assembly 30 and the lower air-blowing assembly 20; on the basis of the present structure, a plurality of air blowing points may reciprocally be formed on the same position by the upper air-blowing assembly 30; compared to FIG. 3 in the prior art, referring to FIG. 5, a plurality of upper air-blowing points may be formed by the upper air-blowing assembly 30 on different positions, i.e., A1, A2, A3, A4, A5, A6, A7, A8, etc. Due to consecutive airflow during the swing of the air-fence plates 21, an upper air-blowing plane may be formed by a plurality of consecutively connecting upper air-blowing points, i.e., A1, A2, A3, A4, A5, A6, A7, A8, etc. A plurality of lower air-blowing points may be formed by the lower air-blowing assembly 20 on different positions, i.e., B1, B2, B3, B4, B5, B6, B7, B8, B9, etc. Hence, a lower air-blowing plane may be formed by a plurality of consecutively connecting lower air-blowing points, i.e., B1, B2, B3, B4, B5, B6, B7, B8, B9, etc.

In such a setup, the glass 40 swings reciprocally driven by the conveying assembly 10, wherein an air-outlet plane is formed along the length direction of the glass 40; the reciprocal swing of the glass 40 is cooperated with the reciprocal air-flow blowing by the upper air-blowing assembly 30 and the lower air-blowing assembly 20, so that a plurality of consecutive cooling points may be formed on the upper surface and the lower surface of the glass 40, wherein an air-outlet plane is formed along the width direction of the glass 40; synthesis of the two movements leads to that a plurality of consecutive cooling points may be formed on the upper surface and the lower surface of the glass 40; the glass 40 is quenching through the air-outlet plane formed by consecutive air-outlet points during the air-cooling period, so as to lead to a more even surface of the glass, thereby eliminating stress spots on the surface of curved tempered glass, which lead to an increase of the optical quality of the glass.

In summary, in the present invention, during the processing of the curved tempered glass, the position of air-blowing is changed from a static state to a periodic reciprocal swing along the width direction of the glass 40, by which an upper air-outlet plane and a lower air-outlet plane are formed, which leads to a greater air-exposing plane of the glass 40. Adopting the method mentioned above may eliminate stress spots on the surface of the curved tempered glass to a greatest extent, which leads to a significant increase in the optical performance on the glass surface and the visual comfort.

Further, reciprocally swinging direction of the glass 40 in the glass-swinging step is staggered with reciprocally blowing direction in the air-cooling step.

That is, the swinging direction of the upper blowing airflow and the lower blowing airflow may be staggered with the swinging direction of the glass 40 driven by the conveying assembly 10; when the swinging direction of the upper blowing airflow and the lower blowing airflow is towards the left, the swinging direction of the glass 40 driven by the conveying assembly 10 is towards right; when the swinging direction of the upper blowing airflow and the lower blowing airflow is towards right, the swinging direction of the glass 40 driven by the conveying assembly 10 is towards left; the controlling of the swinging direction may be driven by the rotating direction of the motor 25. Composing the two staggered swinging movements enables the upper and lower surface of the glass 40 to enjoy quenching and cooling more evenly, in which stress spots caused by quenching is not easily to be formed, thereby eliminating the stress spots fundamentally.

Admittedly, the swinging directions may also be the same, as enough as the airflow may be formed to a consecutive cooling plane during the swing, which enables the surface of the glass 40 to expose in the air more evenly, so as to effectively reduce the stress spots during the quenching, thereby improving the manufacturing quality.

Further, the method for eliminating stress spots on a surface of glass also comprises a glass manufacturing step, based on the single-curved tempered glass manufacturing device to proceed forward bending or reverse bending process, comprising a heating step, a forming step, and a quenching step; the forward bending process is defined as a manufacturing process in which the center of curvature at any point on the surface of the single-curved tempered glass is above the surface after manufacturing; the reverse bending process is defined as a manufacturing process in which the center of curvature at any point on the surface of the single-curved tempered glass is below the surface after manufacturing.

Main components of the single-curved tempered glass manufacturing apparatus are, in a direction of a manufacturing process, a heating sector, a forming sector, and a quenching sector; the heating sector comprises a furnace chamber, heating elements provided in the furnace chamber, and a group of ceramic conveying rollers 11; and a plane constituted by generatrices on the ceramic conveying rollers 11 is horizontal.

The forming sector mainly comprises a plurality of conveying rollers 11; the conveying rollers 11 are synchronized to convey the glass at the same linear speed of the outer perimeter; a formed curved surface is fitted by each outer perimeter of the conveying rollers 11 collectively.

The quenching sector may be realized by adopting the apparatus for eliminating stress spots on a surface of glass in any one of the embodiments 1-4.

For those skilled in the art, various other changes and variations may be made in accordance with the technical solutions and conceptions described above, in which all these changes and variations should fall within the scope of protection of the claims in the present invention.

The invention claimed is:

1. An apparatus for eliminating stress spots on a surface of glass, characterized by comprising:
    a conveying assembly, provided with a conveying surface for reciprocally conveying glass along a conveying direction;
    an upper air-blowing assembly, provided above the conveying surface, used for guiding air to reciprocally flow above the conveying surface along a swinging direction extending along a width direction of the glass; and
    a lower air-blowing assembly, provided under the conveying surface, used for guiding air to reciprocally flow under the conveying surface along the swinging direction;
    wherein the conveying assembly comprises:
        a conveying supporting-frame;
        a plurality of conveying rollers, rotatably mounted on the conveying supporting-frame; and
        an arc-transforming mechanism, used for transforming the conveying supporting-frame into a circular arc in shape, so as to form a circular-arc-shaped conveying surface on the plurality of conveying rollers;
    wherein the lower air-blowing assembly comprises:
        a plurality of air-fence supporting-frames, connected to the conveying supporting-frame;
        a plurality of air-fence plates, rotatably mounted on the plurality of air-fence supporting-frames, provided with a plurality of air blowholes, used for guiding air to blow to the conveying surface; and
        a swing driving mechanism, driving the air-fence plates to reciprocally swing along the swinging direction;
        wherein the arc-transforming mechanism comprises:
            a plurality of arc-transforming plates; and
            an arc-transforming-plate driving part, used for driving the plurality of arc-transforming plates to rotate,
            wherein two adjacent arc-transforming plates are hinged to each other, the plurality of conveying rollers are pivoted to the plurality of arc-transforming plates, each of the plurality of air-fence supporting-frames are connected to each of the plurality of arc-transforming plates, and two adjacent air-fence supporting-frames are connected through a universal joint;
        wherein the arc-transforming-plate driving part comprises:
            a sprocket, pivoted to each of the plurality of air-fence supporting-frames;
            a sprocket shaft, synchronously connected to the sprocket; and
            a sprocket-shaft driving part.

2. The apparatus for eliminating stress spots on a surface of glass according to claim 1, characterized in that the swing driving mechanism comprises:
    a motor, mounted on the air-fence supporting-frame; and
    an eccentric wheel,
    wherein the motor drives the eccentric wheel to rotate, and the eccentric wheel guides the air-fence plates to swing during rotation.

3. The apparatus for eliminating stress spots on a surface of glass according to claim 2, characterized in that the upper air-blowing assembly is identical to the lower air-blowing assembly in structure.

4. The apparatus for eliminating stress spots on a surface of glass according to claim 1, characterized in that the lower air-blowing assembly further comprises a lift-down assembly driving the air-fence plates to move close to or away from the conveying surface.

5. The apparatus for eliminating stress spots on a surface of glass according to claim 4, characterized in that the upper air-blowing assembly is identical to the lower air-blowing assembly in structure.

6. The apparatus for eliminating stress spots on a surface of glass according to claim 1, characterized in that the upper air-blowing assembly is identical to the lower air-blowing assembly in structure.

7. The apparatus for eliminating stress spots on a surface of glass according to claim 1, characterized by further comprising a heating sector; the heating sector comprises a furnace chamber, heating elements provided in the furnace chamber, and a group of ceramic conveying rollers; and
    a plane constituted by generatrices on the ceramic conveying rollers is horizontal.

8. A method for eliminating stress spots on a surface of glass, characterized by comprising:
    a conveying step, the glass being conveyed to between an upper air-blowing assembly and a lower air-blowing assembly by a conveying assembly during a quenching and tempering period of the glass;
    a glass swinging step, the glass swinging reciprocally under an action of the conveying assembly along a conveying surface; and
    an air-cooling step, the upper air-blowing assembly blowing reciprocally along a width direction of an upper surface of the glass, the lower air-blowing assembly blowing reciprocally along a width direction of a lower surface of the glass,
    wherein the conveying assembly comprises:
        a conveying supporting-frame;
        a plurality of conveying rollers, rotatably mounted on the conveying supporting-frame; and
        an arc-transforming mechanism, used for transforming the conveying supporting-frame into a circular arc in shape, so as to form a circular-arc-shaped conveying surface on the plurality of conveying rollers;
    wherein the lower air-blowing assembly comprises:
        a plurality of air-fence supporting-frames, connected to the conveying supporting-frame;
        a plurality of air-fence plates, rotatably mounted on the plurality of air-fence supporting-frames, provided with a plurality of air blowholes, used for guiding air to blow to the conveying surface; and
        a swing driving mechanism, driving the air-fence plates to reciprocally swing along the swinging direction;
        wherein the arc-transforming mechanism comprises:
            a plurality of arc-transforming plates; and
            an arc-transforming-plate driving part, used for driving the plurality of arc-transforming plates to rotate,
            wherein two adjacent arc-transforming plates are hinged to each other, the plurality of conveying rollers are pivoted to the plurality of arc-transforming plates, each of the plurality of air-fence supporting-frames are connected to each of the plurality of arc-transforming plates, and two adjacent air-fence supporting-frames are connected through a universal joint;

wherein the arc-transforming-plate driving part comprises:
- a sprocket, pivoted to each of the plurality of air-fence supporting-frames;
- a sprocket shaft, synchronously connected to the sprocket; and
- a sprocket-shaft driving part.

9. The method for eliminating stress spots on a surface of glass according to claim 8, characterized in that reciprocally swinging direction of the glass in the glass swinging step is staggered with reciprocally blowing direction in the air-cooling step.

10. The method for eliminating stress spots on a surface of glass according to claim 8, characterized by further comprising a glass manufacturing step.

\* \* \* \* \*